(12) United States Patent
Ameloot et al.

(10) Patent No.: US 7,510,234 B2
(45) Date of Patent: Mar. 31, 2009

(54) VEHICLE FRAME STRUCTURE

(75) Inventors: Ken Ameloot, Roseville, MI (US); Rajesh Mishra, Ypsilanti, MI (US); Basavapatna Naganarayana, Farmington Hills, MI (US); Erik Anderson, Plymouth, MI (US); Daniel Moll, Novi, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 213 days.

(21) Appl. No.: 11/501,241

(22) Filed: Aug. 9, 2006

(65) Prior Publication Data

US 2008/0036235 A1 Feb. 14, 2008

(51) Int. Cl.
*B60J 7/00* (2006.01)

(52) U.S. Cl. .......................... 296/187.12; 296/203.03; 296/30

(58) Field of Classification Search ............ 296/187.12, 296/203.03, 205, 29, 30
See application file for complete search history.

(56) References Cited

U.S. PATENT DOCUMENTS

| | | |
|---|---|---|
| 5,398,989 A | 3/1995 | Winter et al. |
| 5,941,597 A | 8/1999 | Horiuchi et al. |
| 6,129,410 A | 10/2000 | Kosaraju et al. |
| 6,199,907 B1 | 3/2001 | Mugford et al. |
| 6,328,376 B2 * | 12/2001 | Son ........................ 296/203.03 |
| 6,478,367 B2 | 11/2002 | Ishikawa |
| 6,494,525 B1 | 12/2002 | Blank |
| 6,595,579 B2 | 7/2003 | Freitag et al. |
| 6,607,239 B1 | 8/2003 | Fuji |
| 6,702,368 B1 | 3/2004 | Hanyu |
| 6,896,320 B2 | 5/2005 | Kropfeld |
| 6,928,736 B2 | 8/2005 | Czaplicki et al. |
| 6,935,681 B2 | 8/2005 | Hasler et al. |
| 6,938,947 B2 | 9/2005 | Barz et al. |
| 7,077,460 B2 | 7/2006 | Czaplicki et al. |
| 7,152,914 B2 * | 12/2006 | Dingman et al. ....... 296/193.05 |

* cited by examiner

*Primary Examiner*—Joseph D Pape
(74) *Attorney, Agent, or Firm*—Global IP Counselors, LLP (57) ABSTRACT

A vehicle frame structure includes an outer pillar panel, an inner pillar panel and a bulkhead. The outer pillar panel includes an outer upper end, an outer lower end and an outer bulkhead attachment section located between the outer lower end and the outer upper end and at or above a mid-point of the outer pillar panel. The inner pillar panel includes an inner upper end, an inner lower end and an inner bulkhead attachment section located between the inner lower end and inner upper end and at or above a mid-point of the inner pillar panel. The bulkhead is fixedly coupled to the outer and inner bulkhead attachment sections.

37 Claims, 11 Drawing Sheets

Figure 12

VEHICLE FRAME STRUCTURE

BACKGROUND OF THE INVENTION

1. Field of the Invention

The present invention generally relates to a vehicle frame structure. More specifically, the present invention relates to a vehicle frame structure that includes reinforcements in pillar assemblies of the vehicle frame structure.

2. Background Information

Vehicles are continuously being redesigned in order to improve fuel efficiency and to meet various related design challenges. One challenge involves maintaining the structural integrity of a vehicle frame structure without appreciably increasing the weight of the vehicle.

In view of the above, it will be apparent to those skilled in the art from this disclosure that there exists a need for maintaining the strength of a vehicle frame structure without increasing the weight of the vehicle. This invention addresses this need in the art as well as other needs, which will become apparent to those skilled in the art from this disclosure.

SUMMARY OF THE INVENTION

It has been discovered that in order to meet new safety standards, pillar assemblies in the vehicle frame structure of many vehicles may need to be reinforced.

In accordance with one aspect of the present invention, a vehicle frame structure includes an outer pillar panel, an inner pillar panel and a bulkhead. The outer pillar panel includes an outer upper end, an outer lower end and an outer bulkhead attachment section located between the outer lower end and the outer upper end and at or above a mid-point of the outer pillar panel. The inner pillar panel includes an inner upper end, an inner lower end and an inner bulkhead attachment section located between the inner lower end and inner upper end and at or above a mid-point of the inner pillar panel. The bulkhead is fixedly coupled to the outer and inner bulkhead attachment sections.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
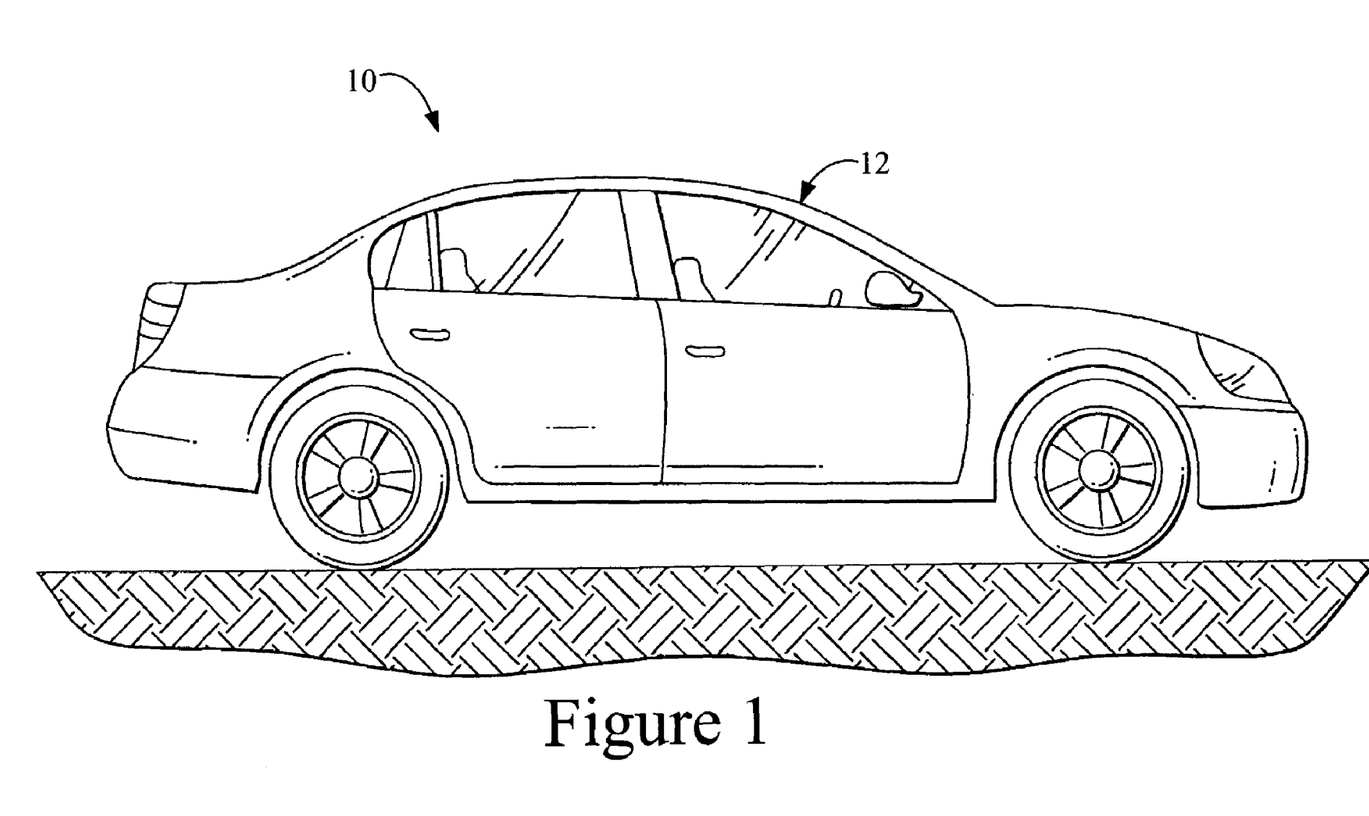
FIG. 1 is a side elevational view of a vehicle that includes a vehicle frame structure in accordance with the present invention.
Figure 2:
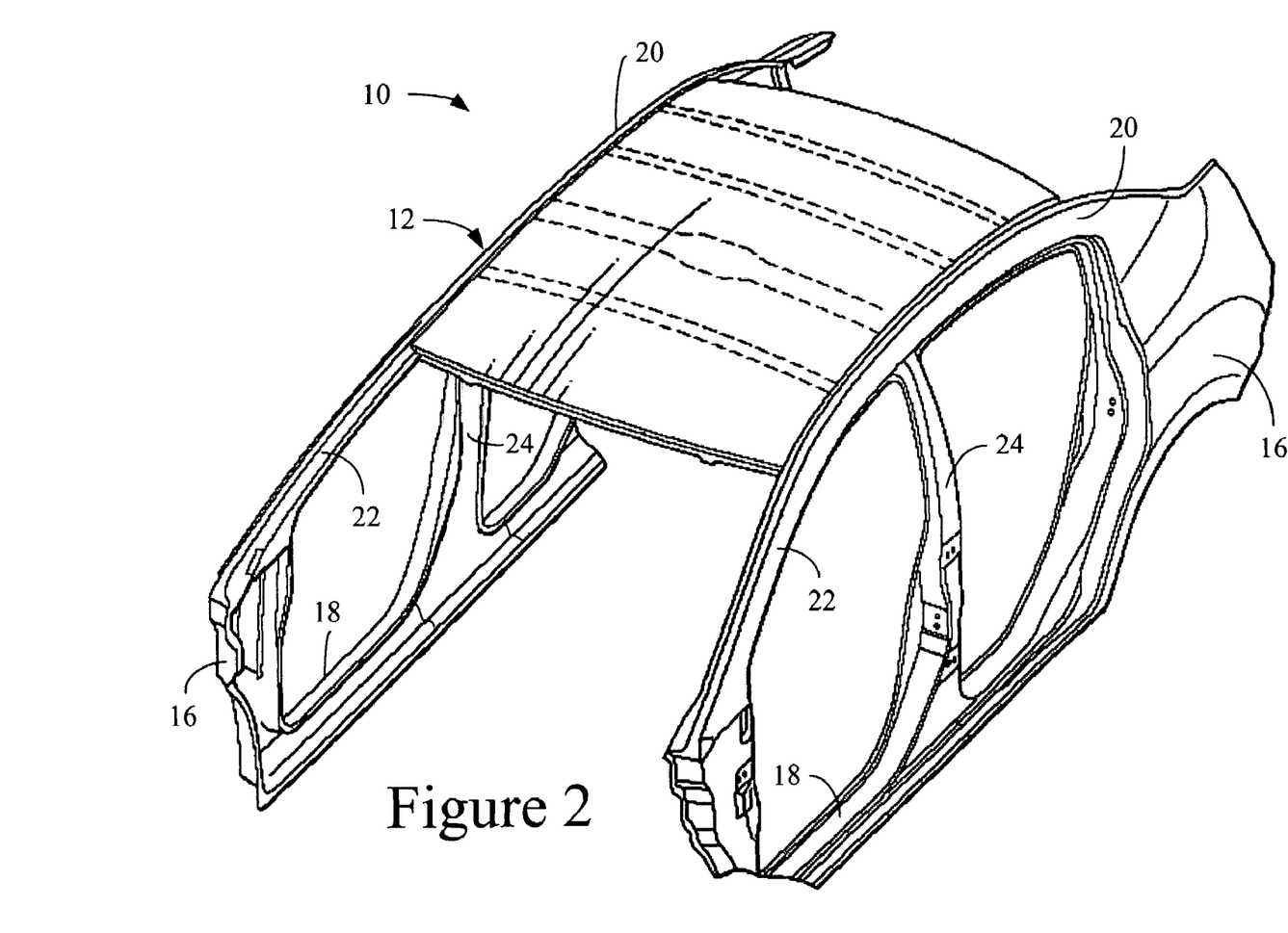
FIG. 2 is a perspective view of the vehicle showing portions of the vehicle frame structure including a pair of B-pillars in accordance with the present invention.

Referring initially to FIG. 1, a vehicle 10 that includes a vehicle frame structure 12 is illustrated in accordance with a first embodiment of the present invention. The vehicle frame structure 12 is shown in FIG. 2 with doors, floor, drive train and interior components removed to provide greater clarity. The vehicle frame structure 12 is preferably assembled using unibody construction and basically includes, among other things, side panels 16, sills 18, roof side rails 20, A-pillars 22 and B-pillars 24. The sides of the vehicle frame structure 12 are generally symmetrical but otherwise identical. For the sake of brevity, description of one side of the vehicle frame structure 12 is provided below. Specifically, the description below of one of the B-pillars 24 applies to both B-pillars 24.

Figure 3:
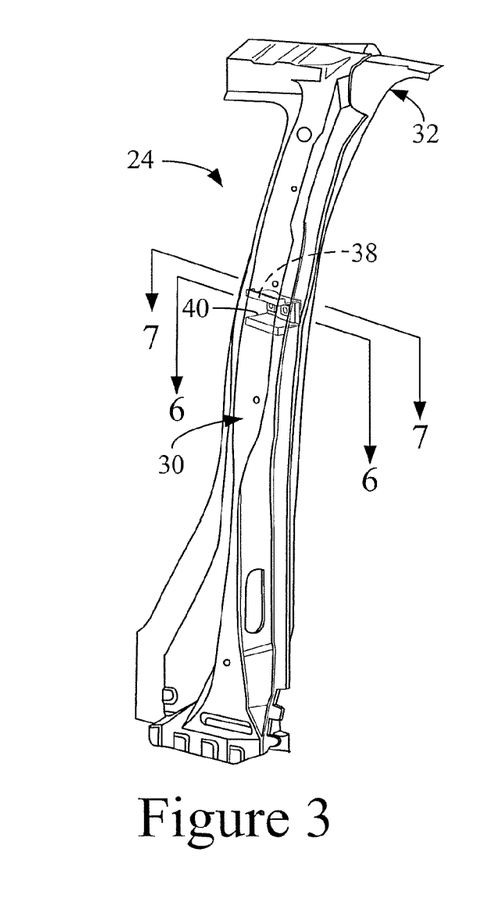
FIG. 3 is a perspective view of one of the B-pillars shown removed from the vehicle frame structure in accordance with a first embodiment of the present invention.
Figure 4:
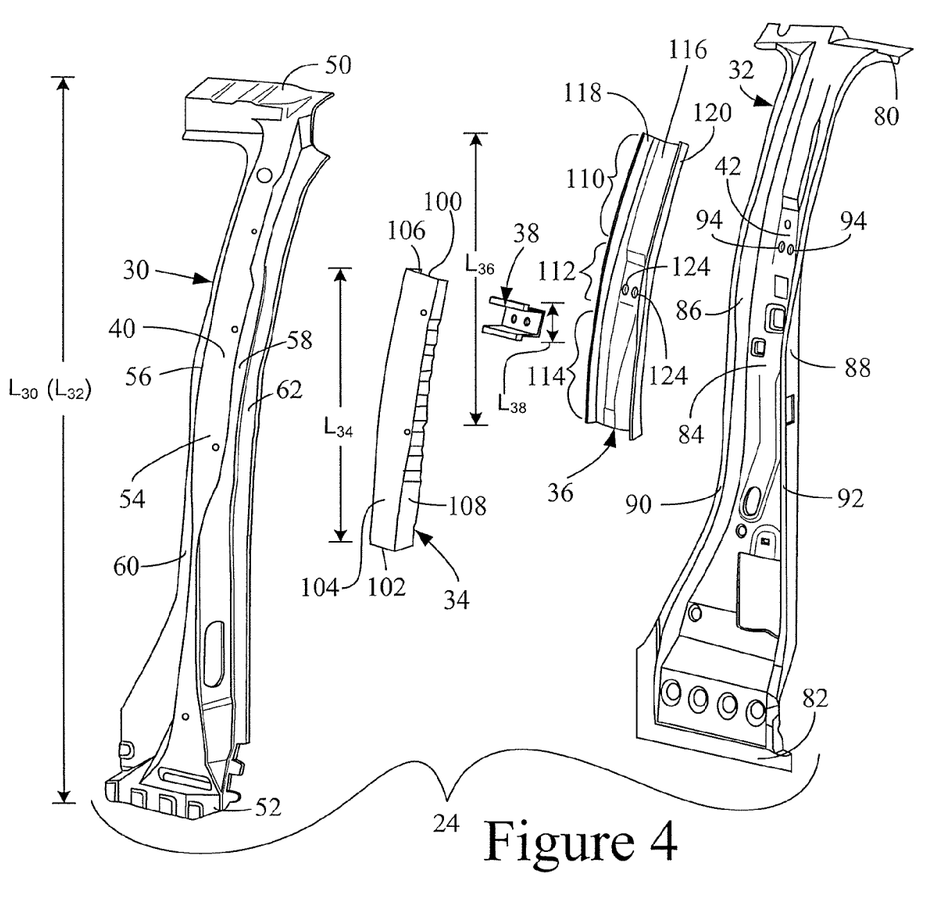
FIG. 4 is an exploded perspective view of the B-pillar depicted in FIG. 3 showing an outer panel, a lower reinforcement member, a bulkhead, an upper reinforcement member and an inner panel of the B-pillar in accordance with the first embodiment of the present invention.

With specific reference to FIGS. 3 and 4, a description of the B-pillar 24 is now provided. The B-pillar 24 is preferably made of metal, such as aluminum or steel. As best shown in FIG. 4, the B-pillar 24 basically includes an outer panel 30 (an outer pillar panel), an inner panel 32 (an inner pillar panel), a lower reinforcement member 34, an upper reinforcement member 36 and a bulkhead 38. The outer panel 30 and the inner panel 32 are fixedly coupled to one another and shaped to form the B-pillar 24 (a pillar assembly). The outer panel 30 and the inner panel 32 can be welded to one another, bolted or fixed together with fasteners (not shown), or held together by adhesives. As indicated in FIG. 3, the B-pillar 24 has a hollow interior with the bulkhead 38 extending laterally between outer and inner bulkhead attachment sections 40 and 42 bridging the outer panel 30 and the inner panel 32 within the hollow interior, as described in greater detail below.

With continued reference to FIG. 4, the outer panel 30 has a generally U-shaped cross-section throughout the majority of its vertical length. The outer panel 30 is preferably a one piece member that includes an outer upper end 50, an outer lower end 52, a central section 54 of the U-shaped cross-section, a front cavity wall 56, a rear cavity wall 58, a front flange 60, a rear flange 62 and the outer bulkhead attachment section 40.

The outer upper end 50 is dimensioned and shaped to engage the roof side rail 20. Preferably, the outer upper end 50 is welded to the roof side rail 20 of the vehicle frame structure 12. The outer lower end 52 is dimensioned and shaped to engage the sill 18. Preferably, the outer lower end 52 is welded to the sill 18 of the vehicle frame structure 12.

Figures 6, 7:
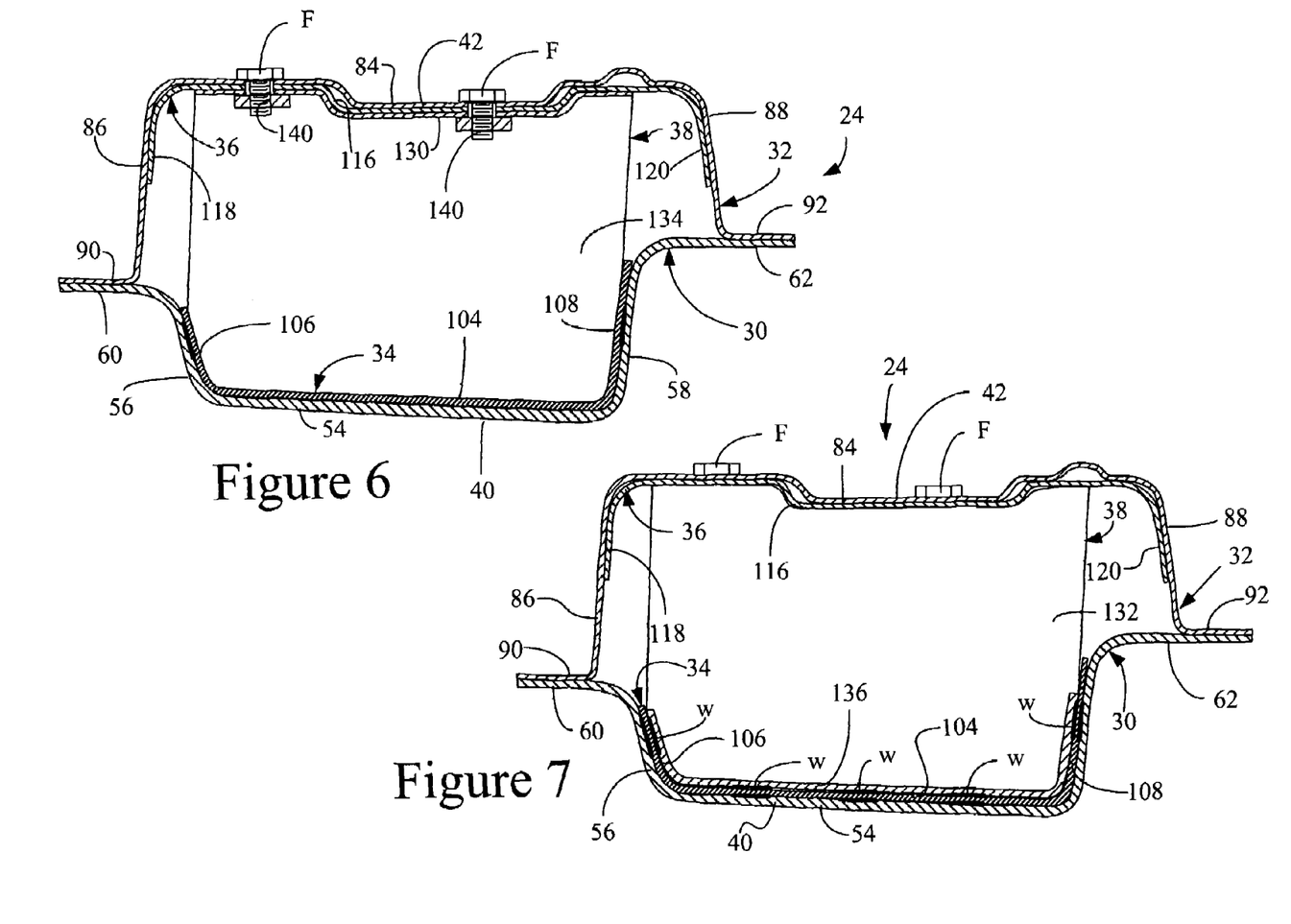
FIG. 6 is a cross-sectional view of the B-pillar taken along the line 6-6 in FIG. 3 showing coupling details between the bulkhead, the upper reinforcement member and the inner panel of the B-pillar in accordance with the first embodiment of the present invention.
FIG. 7 is another cross-sectional view of the B-pillar taken along the line 7-7 in FIG. 3 showing coupling details between the bulkhead, the lower reinforcement member and the outer panel of the B-pillar in accordance with the first embodiment of the present invention.

As shown in FIGS. 6 and 7, the central section 54, the front cavity wall 56 and the rear cavity wall 58 generally define the U-shaped cross-section of the outer panel 30. As shown in FIG. 4, the front flange 60 extends along the front cavity wall 56 between the outer upper end 50 and the outer lower end 52. Similarly, the rear flange 62 extends along the rear cavity wall 58 between the outer upper end 50 and the outer lower end 52.

With reference again to FIG. 4, the outer bulkhead attachment section 40 of the outer panel 30 is located between the outer lower end 52 and the outer upper end 50 at or above a mid-point of the outer panel 30. As described in greater detail below, the bulkhead 38 is coupled to the central section 54 (a central portion) of the U-shaped cross-section of the outer panel 30 at or above a mid-point of the outer panel 30. Further, the outer bulkhead attachment section 40 and the bulkhead 38 are coupled together by any of a variety of welding techniques.

The outer bulkhead attachment section 40 is located proximate (adjacent to or at) a buckling deformation area of the outer panel 30. The buckling deformation area of the outer panel 30 is a location determined by experimentation and engineering considerations. Specifically, with the bulkhead 38 removed, the vehicle frame structure 12 is tested with approximately vertically applied compressive forces directed to the roof of the vehicle 10, the roof side rails 20 and/or the B-pillar 24. As compressive force is increased, the B-pillar 24 eventually begins to buckle or bend. The point, area or region of the B-pillar 24 that buckles, is considered to be the buckling deformation area.

For each specific vehicle frame structure, such as the vehicle frame structure 12, the buckling deformation area of the B-pillar 24 is typically located in specific region of the B-pillar 24. Therefore it should be understood from the drawings and the description herein that the buckling deformation area of a B-pillar changes from vehicle model to vehicle model. The inventors have experimentally determined that for most vehicle models that include a B-pillar having curved upper regions, such as the B-pillar 24, the buckling deformation area is approximately located at or above the vertical mid-point of the outer panel 30 and the inner panel 32. However, it should be understood from the drawings and the description herein that the buckling deformation area can also be located at or below the vertical mid-point of some B-pillar configurations. Specifically, the exact location of the buckling deformation area depends upon the specific design and shape of the various pillars of the vehicle frame structure 12.

With reference again to FIG. 4, the inner panel 32 has a generally U-shaped cross-section throughout the majority of its vertical length. The inner panel 32 is preferably a one piece member that includes an inner upper end 80, an inner lower end 82, a central section 84 of the U-shaped cross-section, a front cavity wall 86, a rear cavity wall 88, a front flange 90, a rear flange 92 and the inner bulkhead attachment section 42.

The inner upper end 80 is dimensioned and shaped to engage the roof side rail 20. Preferably, the inner upper end 80 is welded to the roof side rail 20 of the vehicle frame structure 12. The inner lower end 82 is dimensioned and shaped to engage the sill 18. Preferably, the inner lower end 82 is welded to the sill 18 of the vehicle frame structure 12.

As shown in FIGS. 6 and 7, the central section 84, the front cavity wall 86 and the rear cavity wall 88 generally define the U-shaped cross-section of the inner panel 32. As shown in FIG. 4, the front flange 90 extends along the front cavity wall 86 between the inner upper end 80 and the inner lower end 82. Similarly, the rear flange 92 extends along the rear cavity wall 88 between the inner upper end 80 and the inner lower end 82. The B-pillar 24 is at least partially formed by welding (or otherwise fastening) the front flange 90 of the inner panel 32 to the front flange 60 of the outer panel 30, and welding (or otherwise fastening) the rear flange 92 of the inner panel 32 to the rear flange 62 of the outer panel 30.

With reference again to FIG. 4, the inner bulkhead attachment section 42 of the inner panel 32 is located between the inner lower end 82 and the inner upper end 80, at or above a mid-point of the inner panel 32. As described in greater detail below, the bulkhead 38 is coupled to the central section 84 (a central portion) of the U-shaped cross-section of the inner panel 32 at or above a mid-point of the inner panel 32. Further, the inner bulkhead attachment section 42 and the bulkhead 38 are coupled together by at least one, but preferably two fasteners F as described in greater detail below.

Figure 8:
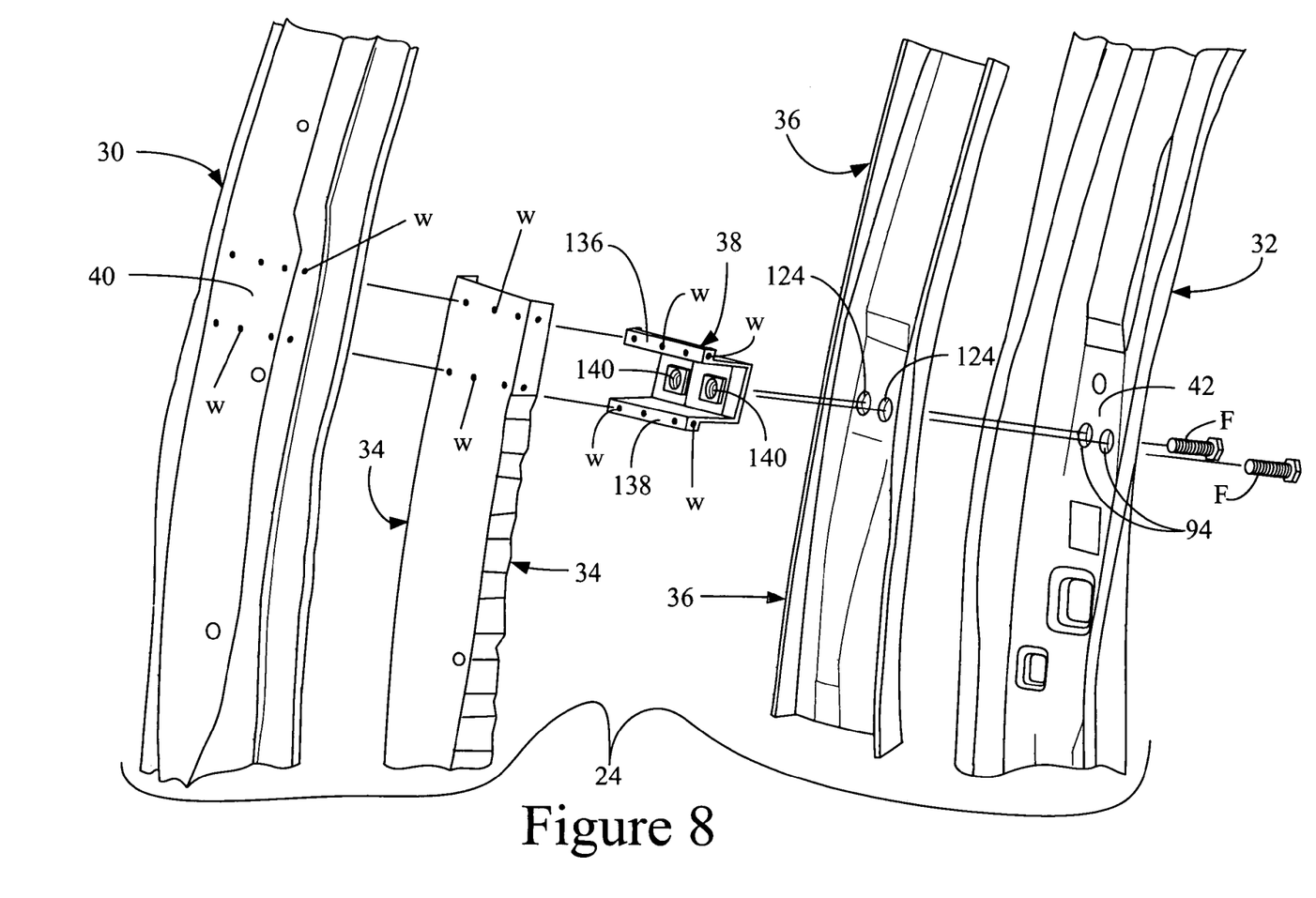
FIG. 8 is an enlarged exploded perspective view of the B-pillar similar to FIG. 4 showing coupling relationships between the outer panel, the lower reinforcement member and the bulkhead, and the coupling relationships between the bulkhead, the upper reinforcement member and the inner panel of the B-pillar in accordance with the first embodiment of the present invention.

The inner bulkhead attachment section 42 is located proximate (adjacent to or at) a buckling deformation area of the inner panel 32. The buckling deformation area of the inner panel 32 is a location determined by experimentation and engineering considerations, as described above with respect to the buckling deformation area of the outer panel 30. The inner bulkhead attachment section 42 of the inner panel 32 is preferably provided with a pair of fastener openings 94 as shown in FIGS. 4 and 8.

As shown in FIG. 4, the lower reinforcement member 34 is typically included within the hollow interior of the B-pillar 24 to provide additional strength to meet side impact safety standards. It should be understood that the lower reinforcement member 34 is an optional element and is not necessarily included in all vehicles since not all vehicles require reinforcement to meet side impact safety standards. When included, the lower reinforcement member 34 is disposed between the outer panel 30 and the bulkhead 38 along an outboard side of the hollow interior of the B-pillar 24 (the pillar assembly). The lower reinforcement member 34 is dimensioned to extend vertically along the central section 54 of the outer panel 30 from at least the outer bulkhead attachment section 40 of the outer panel 30 downward toward the outer lower end 52.

The lower reinforcement member 34 has an upper end 100, a lower end 102, a central wall 104, a front wall 106 and a rear wall 108. The central wall 104, the front wall 106 and the rear wall 108 define a U-shape in cross-section, as shown in FIGS. 6 and 7. The lower reinforcement member 34 is preferably welded to the outer panel 30 of the B-pillar 24 in a conventional manner, but can alternatively be bolted, fixed with fasteners or mechanical connections such as interlocking portions or fixed with adhesives.

Specifically, the upper end 100 of the lower reinforcement member 34, the bulkhead 38 and the outer bulkhead attachment section 40 of the outer panel 30 are all welded together as indicated in FIGS. 6 and 7 by welds W. Portions of the central wall 104 can be spaced apart from the central section 54 of the outer panel 30 toward the lower end 102, or alternatively can abut the central section 54 along most or all of its length depending upon engineering and design considerations. The front wall 106 and the rear wall 108 of the lower reinforcement member 34 are welded at spaced apart locations (not shown) to the front cavity wall 56 and the rear cavity wall 58 of the outer panel 30 in a conventional manner.

As shown in FIG. 4, the upper reinforcement member 36 is disposed between the inner panel 32 and the bulkhead 38. The upper reinforcement member 36 extends vertically along an upper region of the central section 84 of the inner panel 32. The upper reinforcement member 36 includes an upper region 110, a central region 112, a lower region 114, a central wall 116, a front wall 118 (a side section) and a rear wall 120 (a side section). The upper region 110 (an upper portion) extends a majority of a distance between the inner upper end 80 of the inner panel 32 and the bulkhead 38. The lower region 114 (a lower portion) extends to at least a mid-portion of inner panel 32. The upper reinforcement member 36 has a U-shaped cross section that is defined by the central wall 116, the front wall 118 and the rear wall 120. At least the front wall 118 and the rear wall 120 are welded to the inner panel 32 in a conventional manner but can alternatively be bolted, fixed with fasteners or mechanical connections such as interlocking portions or fixed with adhesives. As is also shown in FIG. 4, the outer panel 30 has an overall vertical length $L_{30}$, and the inner panel 32 has an overall vertical length $L_{32}$, the lower reinforcement member 34 has overall vertical length $L_{34}$, the upper reinforcement member 36 has an overall vertical length $L_{36}$ and the bulkhead 38 has an overall vertical length $L_{38}$. The overall vertical length $L_{30}$ and the overall vertical length $L_{32}$ are both greater than each of the overall vertical length $L_{34}$, the overall vertical length $L_{36}$ and the overall vertical length $L_{38}$. Further, the overall vertical length $L_{34}$ and the overall vertical length $L_{36}$ are both greater than the overall vertical length $L_{38}$.

The upper reinforcement member 36 is disposed between the inner panel 32 and the bulkhead 38 along an inboard side of the hollow interior of the B-pillar 24 (the pillar assembly). The upper reinforcement member 36 extends vertically along the central section 54 of the inner panel 32. The central region 112 of the upper reinforcement member 36 is provided with fastener apertures 124. The upper reinforcement member 36 is typically included in the B-pillar 24 for support of a seatbelt mechanism (not shown). It should be understood from the drawings and the description herein that the upper reinforcement member 36 is an optional element and is not necessary for all vehicle frame structure 12 designs.

Figure 5:
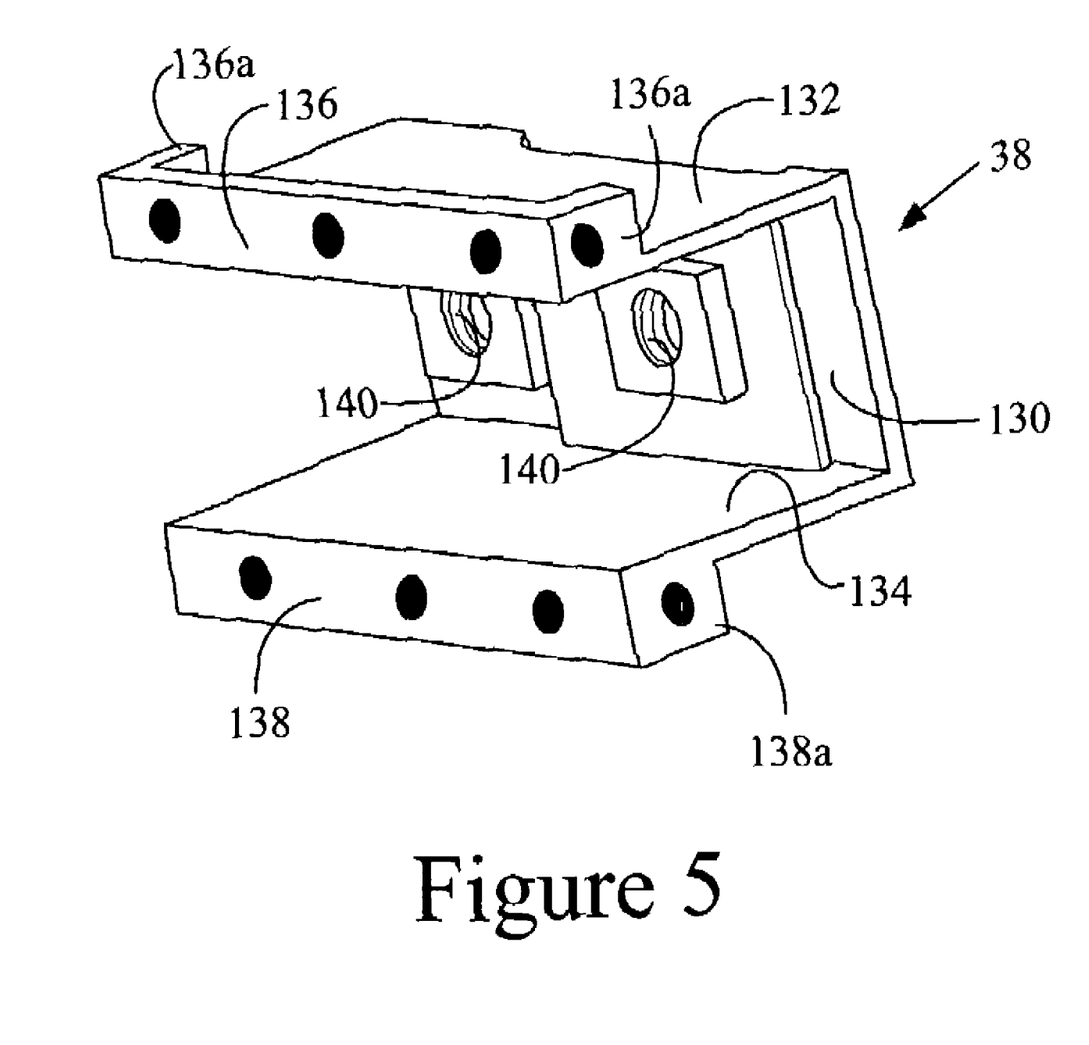
FIG. 5 is a perspective view of the bulkhead of the B-pillar shown removed from the B-pillar in accordance with the first embodiment of the present invention.

With specific reference now to FIGS. 5 through 8, a description of the bulkhead 38 is now provided. As shown in FIGS. 6 and 7, the bulkhead 38 is fixedly coupled to the outer bulkhead attachment section 40 and inner bulkhead attachment section 42. As shown in FIG. 5, the bulkhead 38 is generally U-shaped and includes a central section 130, an upper leg 132 and a lower leg 134. The upper leg 132 includes an upwardly extending flange 136 and the lower leg 134 includes a downwardly extending flange 138. The upwardly extending flange 136 includes two angled flange sections 136a and the downwardly extending flange 138 includes two angled flange sections 138a.

The central section 130 extends between the upper leg 132 and the lower leg 134. The central section 130 is also offset from the upwardly extending flange 136 and the downwardly extending flange 138. Specifically, the central section 130 lies in an approximately vertically oriented plane that is spaced apart from a parallel plane through which the upwardly extending flange 136 and the downwardly extending flange 138 extend.

The central section 130 of the bulkhead 38 includes at least one, but preferably two threaded apertures 140. The threaded apertures 140 can be machined into the central section 130 of the bulkhead 38 or can be formed in fastener nuts that are welded to the central section 130. As shown in FIG. 6, the central section 130 of the bulkhead 38 and the inner bulkhead attachment section 42 are connected by fasteners F. The fasteners F extend through the fastener apertures 94 in the central section 84 of the inner panel 32 and the fastener apertures 124 of the central region 112 of the upper reinforcement member 36 and into the threaded apertures 140.

The upwardly extending flange 136 (including the angled flange sections 136a) and the downwardly extending flange 138 (including the angled flange sections 138a) of the bulkhead 38 and the outer bulkhead attachment section 40 are coupled together by welds W. More specifically, the welds W bond the upwardly extending flange 136 and the downwardly extending flange 138 directly to the upper end 100 of the lower reinforcement member 34. Since the upwardly extending flange 136 and the downwardly extending flange 138, the lower reinforcement member 34 and the outer bulkhead attachment section 40 are welded together generally simultaneously, the welds W bond all three members together. Alternatively, interlocking elements, mechanical connections or adhesives can be employed.

As shown in FIGS. 6 and 7, the bulkhead 38 approximately spans a horizontal width of the hollow interior of the B-pillar 24 (the pillar assembly) and at least partially spans or partitions the hollow interior of the B-pillar 24. Consequently, the bulkhead 38 interconnects the central region 112 (central portion) of the upper reinforcement member 36 to the upper end 100 of the lower reinforcement member 34 and further interconnects the inner panel 32 to the outer panel 30 within the hollow interior of the B-pillar 24.

It should be understood from the drawings and the description herein that the central section 130 of the bulkhead 38 can be secured to the central section 84 of the inner panel 32 by the fasteners F or alternatively by welding the central section 130 of the bulkhead 38 to the central region 112 of the upper reinforcement member 36 and hence to the central section 84 of the inner panel 32. Alternatively, interlocking elements, mechanical connections or adhesives can be employed.

It should also be understood from the drawings and the description herein that the term bulkhead is generally defined as a transverse reinforcing frame in the body of a structural element. Such definition is typically associated with aeronautics but also applies to the present invention.

Second Embodiment

Figure 9:
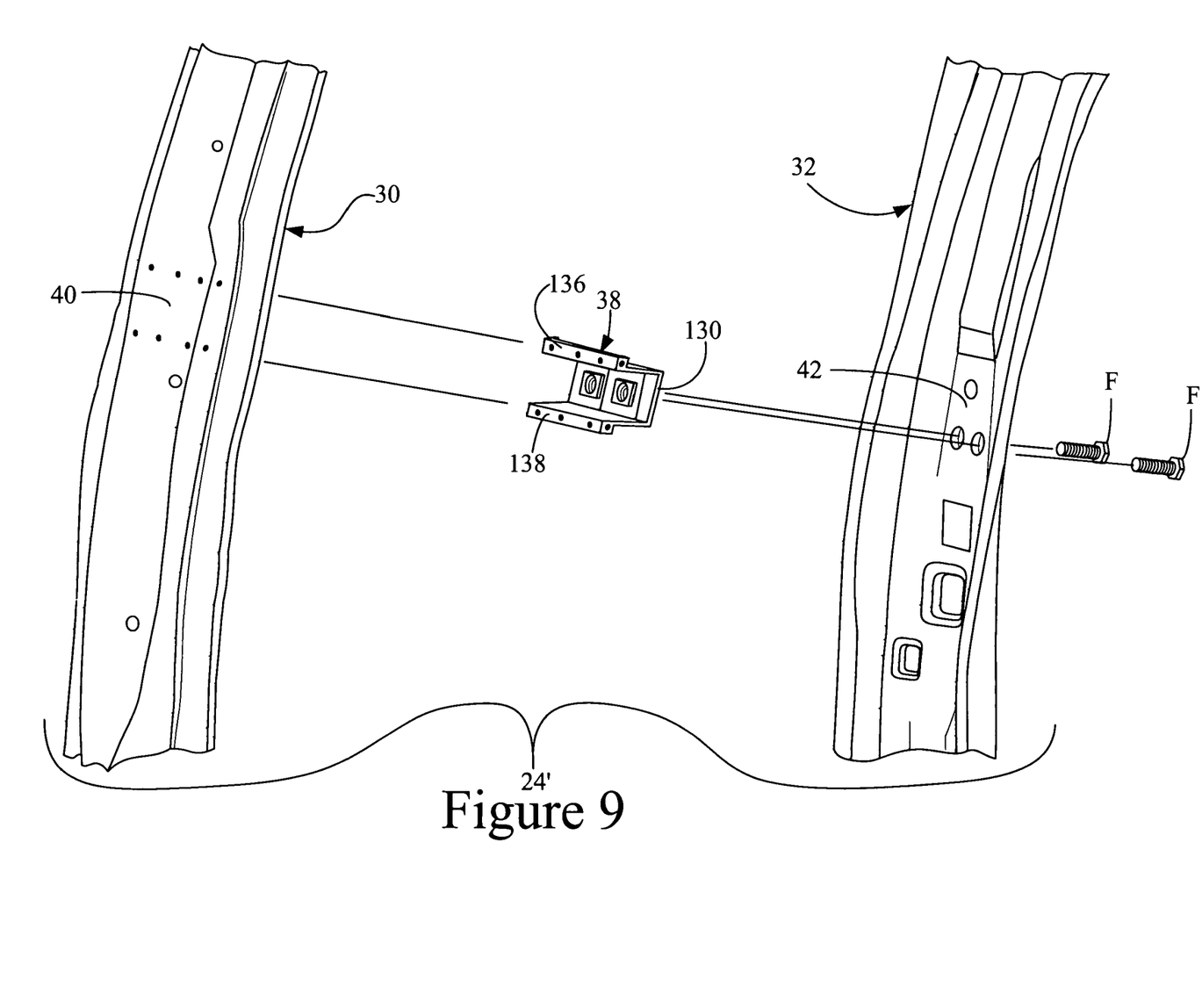
FIG. 9 is an enlarged exploded perspective view of a B-pillar similar to FIG. 8 showing coupling relationships between the outer panel and the bulkhead, and the bulkhead and the inner panel of the B-pillar in accordance with a second embodiment of the present invention.

Referring now to FIG. 9, a B-pillar 24' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The B-pillar 24' is identical to the B-pillar 24 of the first embodiment except that the lower reinforcement member 34 and the upper reinforcement member 36 are not required and have been omitted. In the second embodiment, the upwardly extending flange 136 and the downwardly extending flange 138 of the bulkhead 38 are in direct contact with and welded to the outer bulkhead attachment section 40 of the outer panel 30. Further, the central section 130 of the bulkhead 38 is held in direct contact with the inner bulkhead attachment section 42 by the fastening engagement of the fasteners F.

It should be understood from the drawings and the description herein that one or both of the lower reinforcement member 34 and the upper reinforcement member 36 can be omitted from the B-pillar 24 and the B-pillar 24' depending upon vehicle design and engineering considerations.

Third Embodiment

Figure 10:
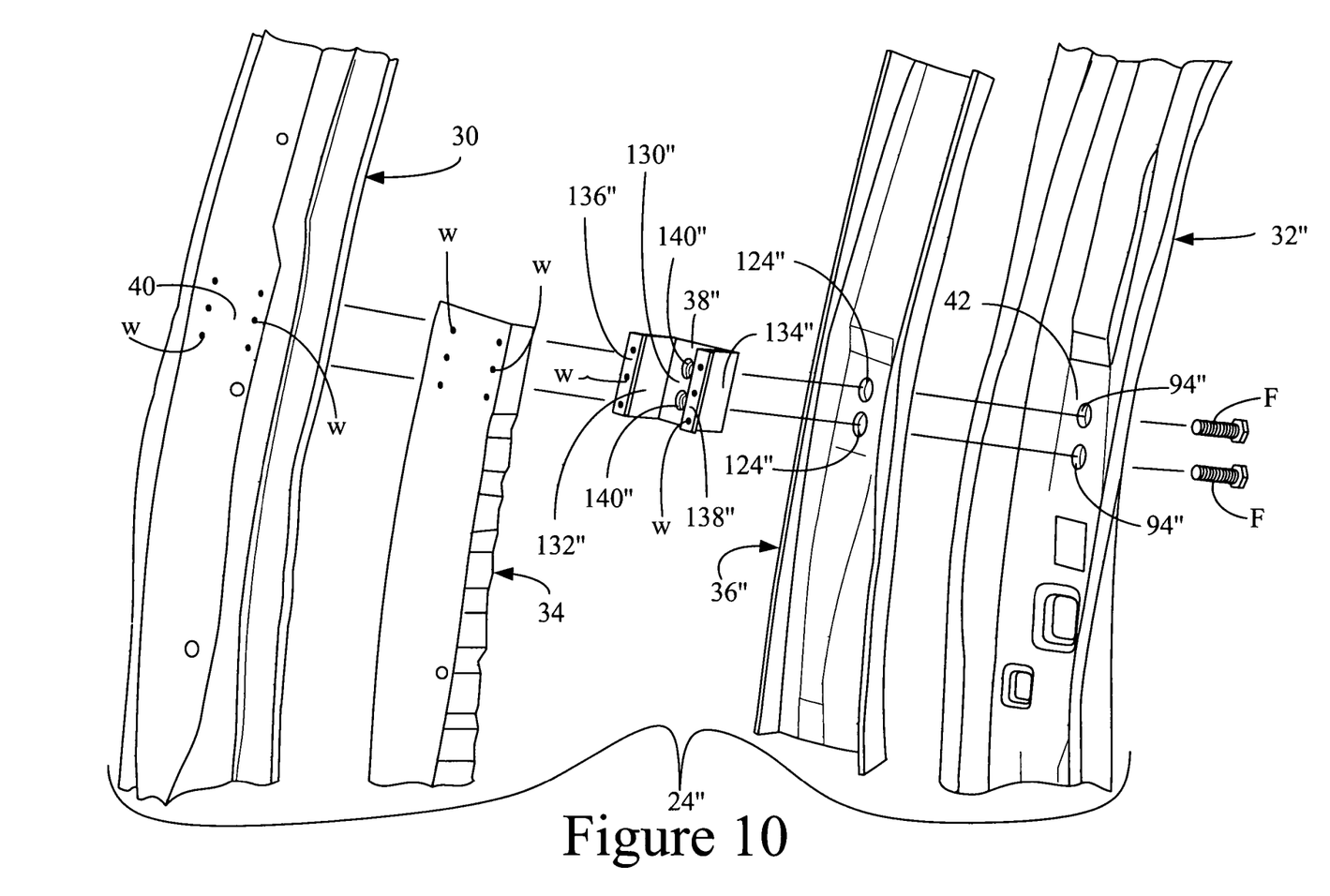
FIG. 10 is an enlarged exploded perspective view of a B-pillar similar to FIGS. 8 and 9 showing coupling relationships between the outer panel, the lower reinforcement member and a bulkhead, and coupling relationships between the bulkhead, an upper reinforcement member and an inner panel of the B-pillar in accordance with a third embodiment of the present invention.

Referring now to FIG. 10, a B-pillar 24" in accordance with a third embodiment will now be explained. In view of the similarity between the first, second and third embodiments, the parts of the third embodiment that are identical to the parts of the first and second embodiments will be given the same reference numerals as the parts of the first embodiment. Moreover, the descriptions of the parts of the third embodiment that are identical to the parts of the first and second embodiments may be omitted for the sake of brevity. The parts of the third embodiment that differ from the parts of the first and second embodiments will be indicated with a double prime (").

The B-pillar 24" of the third embodiment is identical to the B-pillar 24 of the first embodiment except that a bulkhead 38" replaces the bulkhead 38 of the first and second embodiments and further including slight modification of several other elements of the B-pillar assembly. Specifically, the bulkhead 38" is rotated approximately 90 degrees relative to the orientation of the bulkhead 38 of the first embodiment. The bulkhead 38" has many features similar to the bulkhead 38. Specifically, the bulkhead 38" is generally U-shaped and includes a front leg 132" with a forwardly extending flange 136", a rear leg 134" with a rearwardly extending flange 138" and a central section 130" that is offset from the forwardly and rearwardly extending flanges 136" and 138". The central section 130" extends between the front and rear legs 132" and 134" and includes threaded apertures 140" that receive fasteners F.

An inner panel 32" includes two fastener apertures 94" that are approximately vertically oriented with respect to one another. An upper reinforcement member 36" includes vertically aligned fastener apertures 124" that align with the fastener apertures 94". Hence, the central section 130" of the bulkhead 38" and the inner bulkhead attachment section 42 are connected by the threaded fasteners F. The bulkhead 38" is further welded to the lower reinforcement member 34 and the outer panel 30 in the same manner as the bulkhead 38 in the first embodiment, but with the locations of the welds W repositioned. Specifically, the forwardly and rearwardly extending flanges 136" and 138" of the bulkhead 38" and the outer bulkhead attachment section 40 are coupled together by welds.

Fourth Embodiment

Figure 11:
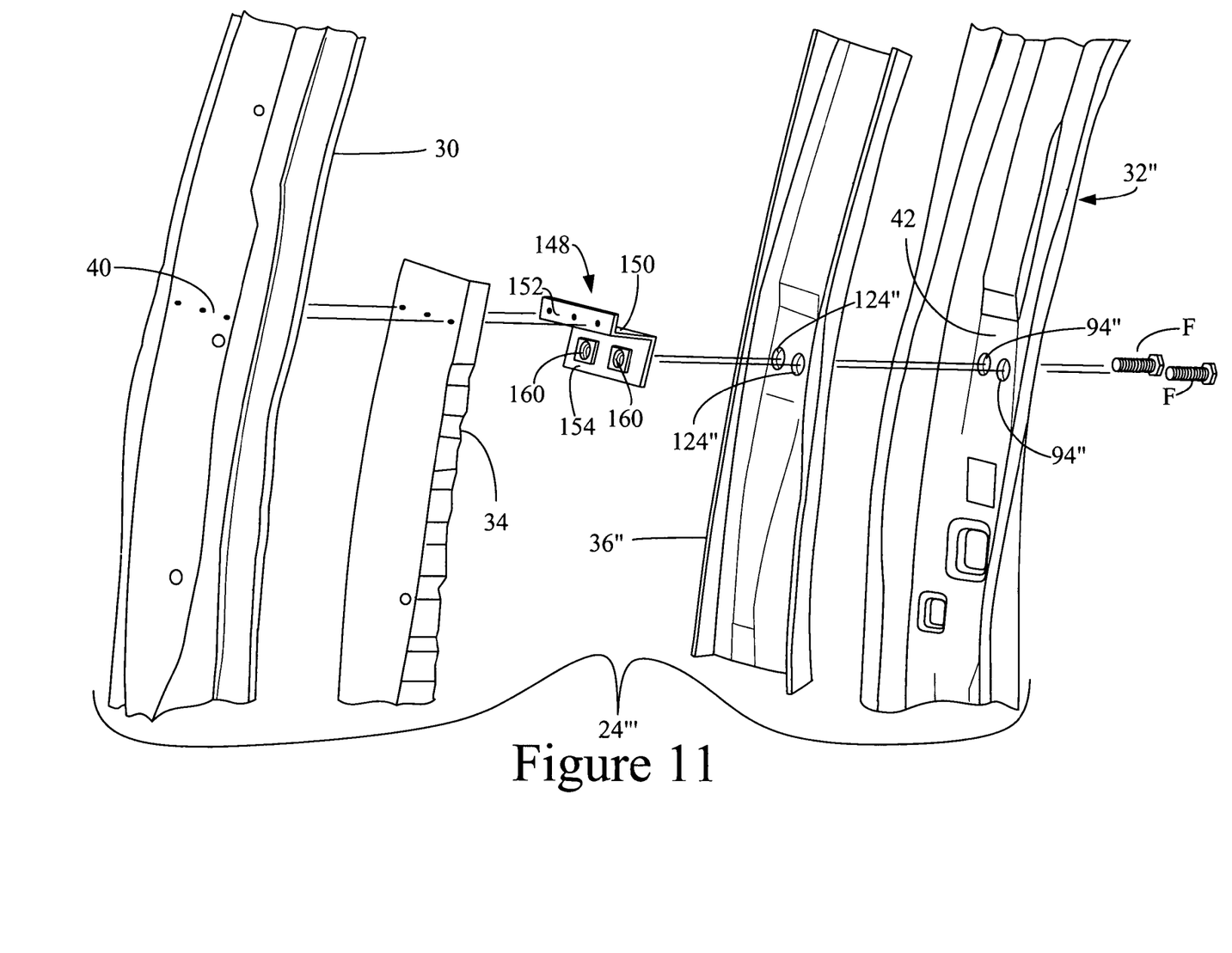
FIG. 11 is an enlarged exploded perspective view of a B-pillar similar to FIGS. 8, 9 and 10 showing coupling relationships between the outer panel, the lower reinforcement member and a bulkhead, and coupling relationships between the bulkhead, an upper reinforcement member and an inner panel of the B-pillar in accordance with a fourth embodiment of the present invention.
Figure 12:
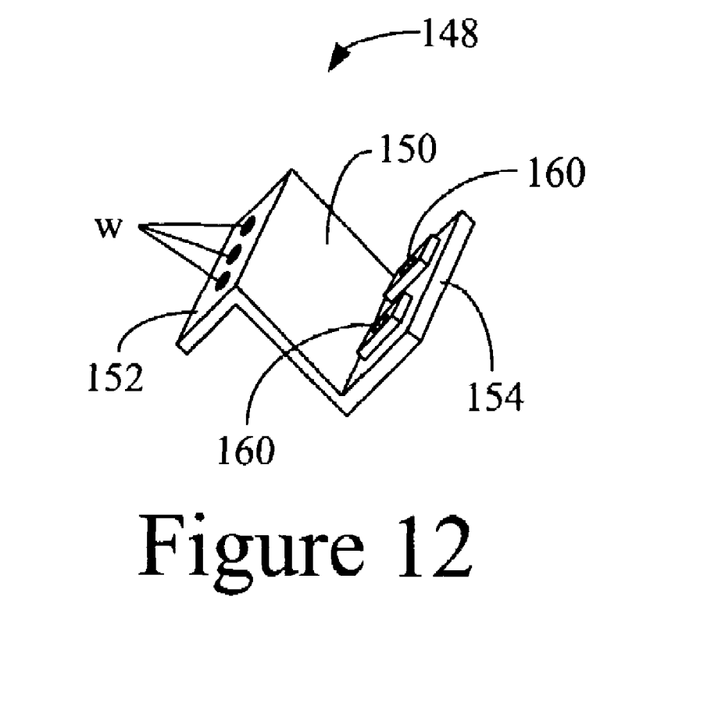
FIG. 12 is a perspective view of the bulkhead depicted in FIG. 11 in accordance with the fourth embodiment of the present invention.

Referring now to FIGS. 11 and 12, a B-pillar 24''' in accordance with a fourth embodiment will now be explained. In view of the similarity between the first, second, third and fourth embodiments, the parts of the fourth embodiment that are identical to the parts of the first, second, and third embodiments will be given the same reference numerals as the parts of the first embodiment. Moreover, the descriptions of the parts of the fourth embodiment that are identical to the parts of the first, second and third embodiments may be omitted for the sake of brevity. The parts of the fourth embodiment that differ from the parts of the first, second and third embodiments will be indicated with a triple prime (''') or a new reference numeral.

The B-pillar 24''' includes a bulkhead 148 that is generally Z-shaped and includes a main portion 150 that is dimensioned to extend between the outer panel 30 and the inner panel 32". The bulkhead 148 also includes a first flange 152 and a second flange 154. The first and second flanges 152 and 154 extend from the main portion 150. The first flange 152 is fixedly coupled to the outer panel 30 by welds W. The second flange 154 includes threaded apertures 160 that are dimensioned to receive the fasteners F. The fasteners F fixedly couple the second flange 154 of the bulkhead 148 to the inner panel 32".

It should be understood that the bulkhead 148 can be installed within the B-pillar 24''' at any of a variety of orientations. Specifically, the bulkhead 148 can be rotated 90 degrees relative to the orientation depicted in FIG. 11 and installed.

Fifth Embodiment

Figure 13:
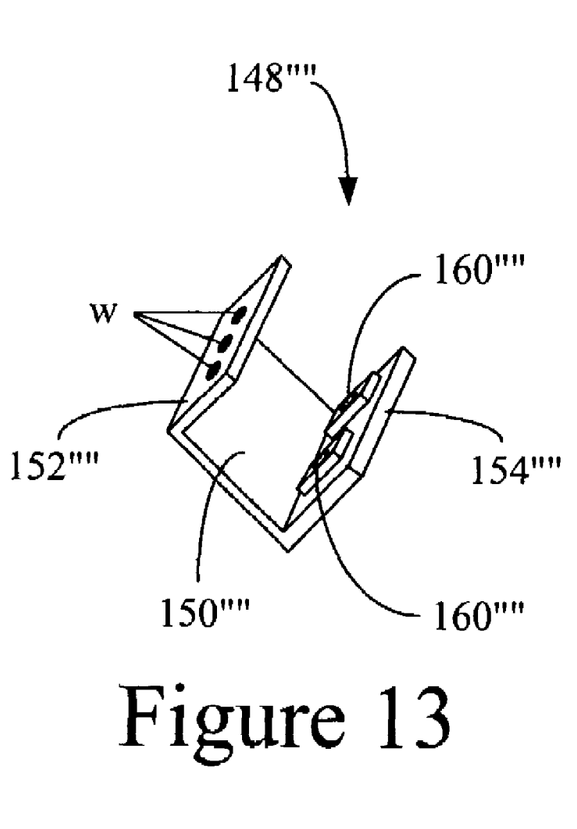
FIG. 13 is a perspective view of a bulkhead also depicted in FIG. 14 in accordance with a fifth embodiment of the present invention.
Figure 14:
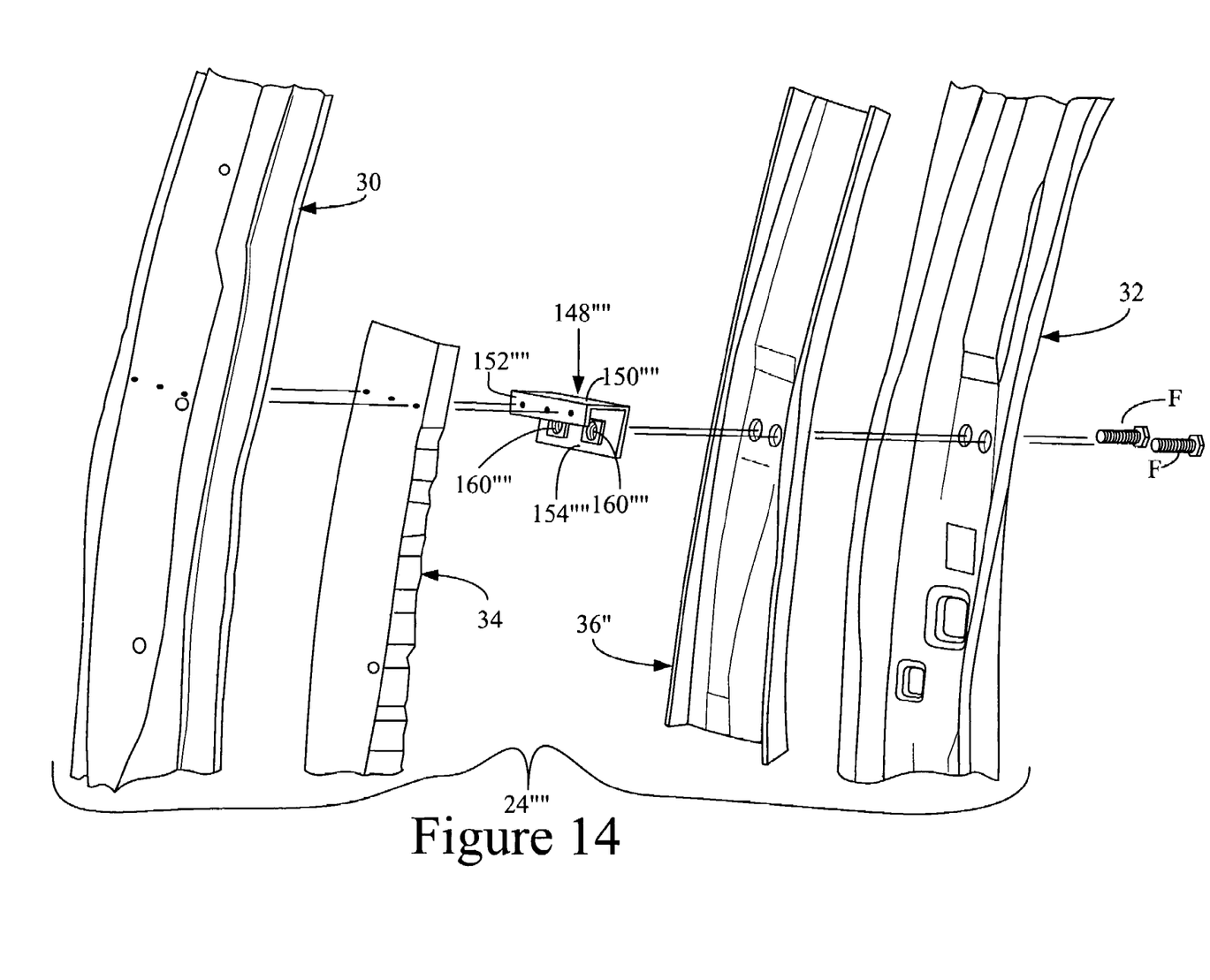
FIG. 14 is an enlarged exploded perspective view of a B-pillar similar to FIGS. 8, 9, 10 and 11 showing coupling relationships between the outer panel, the lower reinforcement member and a bulkhead, and coupling relationships between the bulkhead, an upper reinforcement member and an inner panel of the B-pillar in accordance with the fifth embodiment of the present invention.

Referring now to FIGS. 13 and 14, a B-pillar 24'''' in accordance with a fifth embodiment will now be explained. In view of the similarity between the first, second, third, fourth and fifth embodiments, the parts of the fifth embodiment that are identical to the parts of the first, second, third and fourth embodiments will be given the same reference numerals as the parts of the first, second, third and fourth embodiments. Moreover, the descriptions of the parts of the fifth embodiment that are identical to the parts of the first, second, third and fourth embodiments may be omitted for the sake of brevity. The parts of the fifth embodiment that differ from the parts of the first, second, third and fourth embodiments will be indicated with four primes ('''').

The B-pillar 24'''' includes a bulkhead 148'''' that is generally C-shaped and includes a main portion 150'''' that is dimensioned to extend between the outer panel 30 and the inner panel 32". The bulkhead 148'''' also includes a first flange 152'''' and a second flange 154''''. The first and second flanges 152'''' and 154'''' extend from the main portion 150''''. The first flange 152'''' is fixedly coupled to the outer panel 30 by welds W. The second flange 154'''' includes threaded apertures 160'''' that are dimensioned to receive the fasteners F. The fasteners F fixedly couple the second flange 154'''' of the bulkhead 148'''' to the inner panel 32".

It should be understood that the bulkhead 148"" can be installed within the B-pillar 24"" at any of a variety of orientations. Specifically, the bulkhead 148"" can be rotated 90 degrees relative to the orientation depicted in FIG. 14 and installed.

It should be understood from the drawings and the description herein that the use of any of the bulkheads 38, 38', 38", 148 and 148"" can be used in any pillar of a vehicle frame structure, such as the vehicle frame structure 12. Specifically, the various bulkheads of the present invention can be employed in an A-pillar, C-pillar or any hollow structure to strengthen a buckling point in response to compressive forces.

The various portions of the vehicle 10 and the vehicle frame structure 12 not described above are conventional components that are well known in the art. Since the vehicle frame structure components are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle frame structure comprising:
an outer pillar panel including an outer upper end, an outer lower end and an outer bulkhead attachment section located between the outer lower end and the outer upper end and at or above a mid-point of the outer pillar panel;
an inner pillar panel including an inner upper end, an inner lower end and an inner bulkhead attachment section located between the inner lower end and inner upper end and at or above a mid-point of the inner pillar panel, at least one of the inner bulkhead attachment section and the outer bulkhead attachment section having a generally U-shaped cross-section such that the inner pillar panel and the outer pillar panel form a hollow pillar structure with a gap between the outer and inner bulkhead attachment sections;
a bulkhead fixedly coupled to the outer and inner bulkhead attachment sections bridging the gap between the outer and inner bulkhead attachment sections; and
an upper reinforcement member disposed between the inner pillar panel and the bulkhead, the upper reinforcement member extending vertically along an upper central section of the inner pillar panel such that the upper reinforcement member extends vertically beyond both upper and lower ends of the bulkhead, the upper reinforcement member having a bottom end that is spaced upward in a vertical direction from lower ends of both the outer and inner pillar panels.

2. The vehicle frame structure as set forth in claim 1, wherein
the outer bulkhead attachment section of the outer pillar panel has the generally U-shaped cross-section with the bulkhead attached to a central portion of the U-shaped cross-section.

3. The vehicle frame structure as set forth in claim 1, wherein
the inner bulkhead attachment section of the inner pillar panel has the generally U-shaped cross-section with the bulkhead attached to a central portion of the U-shaped cross-section.

4. The vehicle frame structure as set forth in claim 1, wherein
the outer and inner bulkhead attachment sections are above respective mid-points of the outer and inner pillar panels.

5. The vehicle frame structure as set forth in claim 1, wherein
the outer bulkhead attachment section and the bulkhead are coupled together by welds.

6. The vehicle frame structure as set forth in claim 1, wherein
the inner bulkhead attachment section and the bulkhead are connected by at least one threaded fastener.

7. The vehicle frame structure as set forth in claim 1, wherein
the bulkhead is generally U-shaped and includes an upper leg with an upwardly extending flange, a lower leg with a downwardly extending flange and a central section that is offset from the upwardly extending flange and the downwardly extending flange, the central section extending between the upper and lower legs.

8. The vehicle frame structure as set forth in claim 7, wherein
the central section of the bulkhead and the inner bulkhead attachment section are connected by at least one threaded fastener.

9. The vehicle frame structure as set forth in claim 7, wherein
the upwardly and downwardly extending flanges of the bulkhead and the outer bulkhead attachment section are coupled together by welds.

10. The vehicle frame structure as set forth in claim 1, wherein
the upper reinforcement member includes an upper portion and a lower portion with the upper portion extending a majority of a distance between the inner upper end of the inner pillar panel and the bulkhead, and the lower portion extending to at least a mid-portion of the inner pillar panel.

11. A vehicle frame structure comprising:
an outer pillar panel including an outer upper end, an outer lower end and an outer bulkhead attachment section located between the outer lower end and the outer upper end and at or above a mid-point of the outer pillar panel;
an inner pillar panel including an inner upper end, an inner lower end and an inner bulkhead attachment section located between the inner lower end and inner upper end and at or above a mid-point of the inner pillar panel;
a bulkhead fixedly coupled to the outer and inner bulkhead attachment sections; and
an upper reinforcement member disposed between the inner pillar panel and the bulkhead, the upper reinforcement member extending vertically along an upper central section of the inner pillar panel, the upper reinforcement member having a U-shaped cross section and including side sections welded to the inner pillar panel.

12. The vehicle frame structure as set forth in claim 11, wherein
the bulkhead is generally U-shaped and includes an upper leg with an upwardly extending flange, a lower leg with a downwardly extending flange and a central section that is offset from the upwardly extending flange and the downwardly extending flange, the central section extending between the upper and lower legs.

13. The vehicle frame structure as set forth in claim 12, wherein
the central section of the bulkhead, the upper reinforcement member and the inner bulkhead attachment section are connected by at least one threaded fastener.

14. The vehicle frame structure as set forth in claim 1, further comprising:
a lower reinforcement member disposed between the outer pillar panel and the bulkhead, the lower reinforcement member extending vertically along a central portion of the outer pillar panel.

15. The vehicle frame structure as set forth in claim 14, wherein
the lower reinforcement member extends from at least the outer bulkhead attachment section of the outer pillar panel downward along the outer pillar panel.

16. The vehicle frame structure as set forth in claim 15, wherein
the lower reinforcement member has an upper end that is welded to the bulkhead and the outer bulkhead attachment section of the outer pillar panel.

17. A vehicle frame structure comprising:
an outer pillar panel including an outer upper end, an outer lower end and an outer bulkhead attachment section located between the outer lower end and the outer upper end and at or above a mid-point of the outer pillar panel;
an inner pillar panel including an inner upper end, an inner lower end and an inner bulkhead attachment section located between the inner lower end and inner upper end and at or above a mid-point of the inner pillar panel;
a bulkhead fixedly coupled to the outer and inner bulkhead attachment sections;
a lower reinforcement member disposed between the outer pillar panel and the bulkhead, the lower reinforcement member extending vertically along a central portion of the outer pillar panel; and
an upper reinforcement member disposed between the inner pillar panel and the bulkhead, the upper reinforcement member extending vertically along an upper central section of the inner pillar panel.

18. The vehicle frame structure as set forth in claim 17, wherein
the upper reinforcement member includes an upper portion and a lower portion with the upper portion extending a majority of a distance between the inner upper end of the inner pillar panel and the bulkhead, and the lower portion extending to at least a mid-portion of the inner pillar panel.

19. The vehicle frame structure as set forth in claim 18, wherein
the lower reinforcement member has an upper end and the upper reinforcement member has a central portion, and
the bulkhead interconnects the central portion of the upper reinforcement member to the upper end of the lower reinforcement member.

20. The vehicle frame structure as set forth in claim 1, wherein
the bulkhead is generally U-shaped and includes a front leg with a forwardly extending flange, a rear leg with a rearwardly extending flange and a central section that is offset from the forwardly and rearwardly extending flanges, the central section extending between the front and rear legs.

21. The vehicle frame structure as set forth in claim 20, wherein
the central section of the bulkhead and the inner bulkhead attachment section are connected by at least one threaded fastener.

22. The vehicle frame structure as set forth in claim 20, wherein
the forwardly and rearwardly extending flanges of the bulkhead and the outer bulkhead attachment section are coupled together by welds.

23. The vehicle frame structure as set forth in claim 1, wherein
the outer pillar panel and the inner pillar panel are fixedly coupled to one another and shaped to form a pillar assembly that has a hollow interior with the bulkhead extending laterally between the outer and inner bulkhead attachment sections bridging the outer pillar panel and the inner pillar panel within the hollow interior.

24. The vehicle frame structure as set forth in claim 23, wherein the bulkhead approximately spans a horizontal width of the hollow interior of the pillar assembly.

25. A vehicle frame structure comprising:
an outer pillar panel including an outer upper end, an outer lower end and an outer bulkhead attachment section located between the outer lower end and the outer upper end and at or above a mid-point of the outer pillar panel;
an inner pillar panel including an inner upper end, an inner lower end and an inner bulkhead attachment section located between the inner lower end and inner upper end and at or above a mid-point of the inner pillar panel;

a bulkhead fixedly coupled to the outer and inner bulkhead attachment sections; and an upper reinforcement member disposed between the inner pillar panel and the bulkhead along an inboard side of the hollow interior of the pillar assembly, the upper reinforcement member extending vertically along an upper central section of the inner pillar panel, the outer pillar panel and the inner pillar panel being fixedly coupled to one another and shaped to form a pillar assembly that has a hollow interior with the bulkhead extending laterally between the outer and inner bulkhead attachment sections bridging the outer pillar panel and the inner pillar panel within the hollow interior.

26. The vehicle frame structure as set forth in claim 23, further comprising:

a lower reinforcement member disposed between the outer pillar panel and the bulkhead along an outboard side of the hollow interior of the pillar assembly, the lower reinforcement member extending vertically along a central portion of the outer pillar panel.

27. The vehicle frame structure as set forth in claim 23, further comprising:

the pillar assembly is a B-pillar.

28. The vehicle frame structure as set forth in claim 1, wherein the outer bulkhead attachment section of the outer pillar panel is located proximate a buckling deformation area of the outer pillar panel and the inner bulkhead attachment section is located proximate a buckling deformation area of the inner pillar panel.

29. The vehicle frame structure as set forth in claim 1, wherein the bulkhead is generally C-shaped and includes a main portion dimensioned to extend between the outer pillar panel and the inner pillar panel, a first flange extending from the main portion fixedly coupled to the outer pillar panel and a second flange extending from the main portion fixedly coupled to the inner pillar panel.

30. The vehicle frame structure as set forth in claim 1, wherein the bulkhead is generally Z-shaped and includes a main portion dimensioned to extend between the outer pillar panel and the inner pillar panel, a first flange extending from the main portion fixedly coupled to the outer pillar panel and a second flange extending from the main portion fixedly coupled to the inner pillar panel.

31. A vehicle frame structure comprising:

an outer pillar panel including an outer upper end, an outer lower end and an outer bulkhead attachment section located between the outer lower end and the outer upper end and at or adjacent to a primary buckling deformation area of the outer pillar panel;

an inner pillar panel including an inner upper end, an inner lower end and an inner bulkhead attachment section located between the inner lower end and inner upper end and at or adjacent to a primary buckling deformation area of the inner pillar panel;

a bulkhead fixedly coupled to the outer and inner bulkhead attachment sections; and an upper reinforcement member disposed between the inner pillar panel and the bulkhead, the upper reinforcement member extending vertically along an upper central section of the inner pillar panel, the upper reinforcement member having a U-shaped cross section and including side sections attached to the inner pillar panel.

32. The vehicle frame structure as set forth in claim 1, wherein the upper reinforcement member has a top end that is spaced downward in a vertical direction from top ends of both the outer and inner pillar panels.

33. The vehicle frame structure as set forth in claim 1, wherein both the inner bulkhead attachment section and the outer bulkhead attachment section have a generally U-shaped cross-section such that the inner pillar panel and the outer pillar panel form the hollow pillar structure with the gap between the outer and inner bulkhead attachment sections.

34. The vehicle frame structure as set forth in claim 1, wherein the upper reinforcement member has a vertical length that is less than the overall vertical length of either of the inner pillar panel and the outer pillar panel; and the bulkhead has a vertical length that is less than the vertical length of the upper reinforcement member.

35. The vehicle frame structure as set forth in claim 31, wherein the upper reinforcement member has a bottom end that is spaced upward in a vertical direction from lower ends of both the outer and inner pillar panels.

36. The vehicle frame structure as set forth in claim 31, wherein the upper reinforcement member has a top end that is spaced downward in a vertical direction from top ends of both the outer and inner pillar panels.

37. The vehicle frame structure as set forth in claim 31, wherein the upper reinforcement member has a first vertical length that is less than the overall vertical length of either of the inner pillar panel and the outer pillar panel; and the bulkhead has a second vertical length that is less than the vertical length of the upper reinforcement member.

* * * * *